US012429608B2

(12) United States Patent
Wang

(10) Patent No.: US 12,429,608 B2
(45) Date of Patent: Sep. 30, 2025

(54) LEO-AUGMENTATION-BASED CONVERGENCE TIME SHORTENING METHOD OF WIDE-AREA UDUC PPP-RTK POSITIONING

(71) Applicant: National Time Service Center, Chinese Academy of Sciences, Xi'an (CN)

(72) Inventor: Kan Wang, Xi'an (CN)

(73) Assignee: National Time Service Center, Chinese Academy of Sciences, Xi'an (CN)

( * ) Notice: Subject to any disclaimer, the term of this patent is extended or adjusted under 35 U.S.C. 154(b) by 337 days.

(21) Appl. No.: 18/332,780

(22) Filed: Jun. 12, 2023

(65) Prior Publication Data
US 2024/0019585 A1    Jan. 18, 2024

(30) Foreign Application Priority Data
Jul. 13, 2022    (CN) .......................... 202210822193.3

(51) Int. Cl.
*G01S 19/44*    (2010.01)
(52) U.S. Cl.
CPC .................................. *G01S 19/44* (2013.01)
(58) Field of Classification Search
CPC ....................................................... G01S 19/44
USPC ......................................................... 342/352
See application file for complete search history.

(56) References Cited

FOREIGN PATENT DOCUMENTS

| CN | 114740508 B | * | 1/2025 | ........... G01S 19/258 |
| WO | WO-2023023902 A1 | * | 3/2023 | ............. G01S 19/33 |
| WO | WO-2024028359 A1 | * | 2/2024 | ............. H04W 12/63 |

* cited by examiner

*Primary Examiner* — Harry K Liu
(74) *Attorney, Agent, or Firm* — Hemisphere Law, PLLC; Zhigang Ma

(57) ABSTRACT

An LEO-augmentation-based convergence time shortening method of wide-area UDUC PPP-RTK positioning is provided, which includes: establishing UDUC PPP-RTK network end observation equations of GNSSs, and integrating navigation signals of an LEO satellite navigation system into the UDUC PPP-RTK network end observation equations, to obtain LEO-integrated GNSS UDUC PPP-RTK network end observation equations; solving network end parameters of the LEO-integrated GNSS UDUC PPP-RTK network end observation equations; correcting user end GNSS UDUC observation equations and user end LEO UDUC observation equations according to the network end parameters; solving corrected user end GNSS UDUC observation equations and corrected user end LEO UDUC observation equations, to obtain a user end positioning vector in an ambiguity-float mode; and a user end float ambiguity vector and its variance-covariance matrix; and using the user end float ambiguity vector and the variance-covariance matrix to perform the PAR; and obtain PPP-RTK user positioning in a PAR-enabled mode.

6 Claims, 4 Drawing Sheets

LEO-AUGMENTATION-BASED CONVERGENCE TIME SHORTENING METHOD OF WIDE-AREA UDUC PPP-RTK POSITIONING

TECHNICAL FIELD

The present disclosure relates to the field of satellite positioning and navigation, and particularly to an LEO-augmentation-based convergence time shortening method of wide-area UDUC PPP-RTK positioning.

BACKGROUND

A precise point positioning-real-time kinematic (PPP-RTK) positioning method combines the advantages of precise point positioning (PPP) and real-time kinematic (RTK) positioning. It gives a user some freedom in space like the PPP, and not requires a short baseline like the RTK. At the same time, it ensures positioning accuracy similar to that of the RTK through integer ambiguity resolution (IAR). An undifferenced and uncombined (UDUC) PPP-RTK demonstrates its advantages in many aspects. No differencing or combination operations are performed at the observation level, which allows the corresponding model to be freely expanded to any number of frequencies. In addition, as various unknown parameters are retained in the observation equation, the opportunity to model the parameters in time and space domains is reserved. To eliminate the rank deficiencies among the estimable parameters, the parameters can be re-formed according to models used for parameters and the S-system theory. S-basis parameters are determined and new estimable parameters are formed.

A wide-area UDUC PPP-RTK positioning can achieve high-precision positioning, while shortening its convergence time is very important for a real-time user. For UDUC PPP-RTK positioning, a network end needs to process and broadcast an estimated satellite clock error vector and a satellite phase bias vector to a user to enable the user to perform the IAR. Depending on the size of a ground station network, the network end selectively transmits the ionospheric delays of the network end ground stations to the user, and the user performs ionospheric delay interpolation according to various models to solve his own ionospheric delay, thereby realizing rapid IAR and rapid convergence of a positioning result. For PPP-RTK in a range of thousands of kilometers, the distance between ground stations is often large, which makes it difficult to perform accurate ionospheric delay interpolation. As such, the user often uses an ionosphere-float model to solve the ionospheric delay by himself, rather than relying on ionospheric delays broadcast by the ground station network.

Because the ionospheric delays need to be solved by a user of PPP-RTK in a wide-area ionosphere-float mode, the user often faces longer convergence time than that in an ionosphere-weighted or ionosphere-fixed mode, especially for the user who needs to perform positioning in a kinematic mode. Studies have shown that using measurements from the global positioning system (GPS) with partial ambiguity resolution (PAR) enabled, it requires more than 20 minutes to make 75% of the kinematic positioning errors in horizontal and vertical directions converge to 5 centimeters (cm). The length of the convergence time depends closely on the model strength, and the convergence time is quite different in different modes, which vary in the number of the global navigation satellite systems (GNSSs) used, whether to solve the integer ambiguity vector, and the positioning mode (kinematic or static).

SUMMARY

In order to solve the above problems in the related art, the present disclosure provides a low-Earth-orbit (LEO)-augmentation-based convergence time shortening method of wide-area UDUC PPP-RTK positioning. The technical problems to be solved by the present disclosure are solved by following technical solutions.

The present disclosure provides an LEO-augmentation-based convergence time shortening method of wide-area UDUC PPP-RTK positioning, which includes:

step 1, establishing UDUC PPP-RTK network end observation equations of global navigation satellite systems (GNSSs), and integrating navigation signals of an LEO satellite navigation system into the UDUC PPP-RTK network end observation equations, to obtain LEO-integrated GNSS UDUC PPP-RTK network end observation equations;

step 2, solving network end parameters of the LEO-integrated GNSS UDUC PPP-RTK network end observation equations;

step 3, correcting the user end GNSS UDUC observation equations and the user end LEO UDUC observation equations according to the network end parameters;

step 4, solving corrected user end GNSS UDUC observation equations and corrected user end LEO UDUC observation equations, to obtain a user end positioning vector in an ambiguity-float mode; and a user end float ambiguity vector and a variance-covariance matrix of the user end float ambiguity vector, and; and step 5, using the user end float ambiguity vector and the variance-covariance matrix of the user end float ambiguity vector to obtain a fully or partially fixed user end ambiguity vector, and performing PPP-RTK user positioning in a partial ambiguity resolution (PAR)-enabled mode with the fully or partially fixed user end ambiguity vector.

In an embodiment of the present disclosure, the UDUC PPP-RTK network end observation equations of the GNSSs are expressed as follows:

$$E(\Delta\varphi_{r,j,G}^{Gs}) = g_r^{Gs}\Delta\tau_r + d\tilde{t}_{r,G} - d\tilde{t}^{Gs} - \mu_j \tilde{\iota}_r^{Gs} + \tilde{\delta}_{r,j,G} - \tilde{\delta}_j^{Gs} + \lambda_j \tilde{N}_{r,j}^{Gs};$$

$$E(\Delta p_{r,j,G}^{Gs}) = g_r^{Gs}\Delta\tau_r + d\tilde{t}_{r,G} - d\tilde{t}^{Gs} + \mu_j \tilde{\iota}_r^{s} + \tilde{d}_{r,j,G} - \tilde{d}_j^{Gs},$$

where subscripts r,j, G represent receiver r, frequency j, and GNSS G, respectively. A superscript Gs represents satellites in GNSS G. ~ represents reformed parameters from original parameters for eliminating rank deficiencies. E(•) is an expectation operator. $\Delta\varphi_{r,j,G}^{Gs}$; and $\Delta p_{r,j,G}^{Gs}$ represent observed-minus-computed (O–C) terms for a carrier phase observation and a pseudorange (code) observation. $g_r^{Gs}$ represents a mapping function for a zenith tropospheric wet delay in a signal direction. $\Delta\tau_r$ represents the zenith tropospheric wet delay. $d\tilde{t}_{r,G}$ represents a reformed receiver clock error. $d\tilde{t}^{Gs}$ represents a reformed GNSS satellite clock error. $\mu_j = f_1^2/f_j^2$, $f_j$ represents a j-th frequency used in GNSS G, $\lambda_j$ represents a corresponding wavelength of the j-th frequency. $\tilde{\iota}_r^{Gs}$ represents a reformed ionospheric delay on the first frequency. $\tilde{\delta}_{r,j,G}$ represents a reformed receiver phase bias, $\tilde{\delta}_j^{Gs}$ represents a reformed GNSS satellite phase bias. $\tilde{N}_{r,j}^{Gs}$ represents a reformed integer ambiguity. $\tilde{d}_{r,j,G}$ represents a reformed receiver code bias, and $\tilde{d}_j^{Gs}$ represents a reformed GNSS satellite code bias;

where the LEO-intergrated UDUC PPP-RTK network end observation equations are expressed as follows:

$$E(\Delta\varphi_{r,j,L}^{Ls}) = g_r^{Ls}\Delta\tau_r + d\tilde{t}_{r,L} - d\tilde{t}^{Ls} - \mu_j \tilde{i}_r^{Ls} + \tilde{\delta}_{r,j,L} - \tilde{\delta}_j^{Ls} + \lambda_j \tilde{N}_{r,j}^{Ls};$$

$$E(\Delta p_{r,j,L}^{Ls}) = g_r^{Ls}\Delta\tau_r + d\tilde{t}_{r,L} - d\tilde{t}^{Ls} + \mu_j \tilde{i}_r^{Ls} + \tilde{d}_{r,j,L} - \tilde{d}_j^{Ls};$$

where a subscript L represents an LEO satellite navigation system, and a superscript Ls represents satellite s in LEO satellite navigation system L. The GNSS and LEO UDUC PPP-RTK network end observation equations form the LEO-integrated GNSS UDUC PPP-RTK network end observation equations.

In an embodiment of the present disclosure, the network end parameters include: a vector of estimated reformed GNSS satellite clock errors $\hat{dt}^{Gs}$, a vector of estimated reformed LEO satellite clock errors $\hat{dt}^{Ls}$, a vector of estimated reformed GNSS satellite phase biases $\hat{\tilde{\delta}}_j^{Gs}$, and a vector of estimated reformed LEO satellite phase biases $\hat{\tilde{\delta}}_j^{Ls}$; and in a situation of j>2, the network end parameters further includes a vector of estimated reformed GNSS satellite code biases $\hat{\tilde{d}}_j^{Gs}$, and a vector of estimated reformed LEO satellite code biases $\hat{\tilde{d}}_j^{Ls}$.

In an embodiment of the present disclosure, step 3 includes:
correcting observed-minus-computed (O–C) terms for user end GNSS carrier phase observations and user end GNSS code observations according to the vector of estimated reformed GNSS satellite clock errors $\hat{dt}^{Gs}$, the vector of estimated reformed GNSS satellite phase biases $\hat{\tilde{\delta}}_j^{Gs}$, and the vector of estimated reformed GNSS satellite code biases $\hat{\tilde{d}}_j^{Gs}$ in the situation of j>2, to obtain the corrected user end GNSS UDUC observation equations expressed as follows:

$$E(\Delta\varphi_{u,j}^{Gs} + \hat{dt}^{Gs} + \hat{\tilde{\delta}}_j^{Gs}) = (G_u^{Gs})^T \Delta x_u + g_u^{Gs}\Delta\tau_u + d\tilde{t}_{u,G} - \mu_j \tilde{i}_u^{Gs} + \tilde{\delta}_{u,j,G} + \lambda_j \tilde{N}_{u,j}^{Gs};$$

$$E(\Delta p_{u,j}^{Gs} + \hat{dt}^{Gs} + \hat{\tilde{d}}_{j>2}^{Gs}) = (G_u^{Gs})^T \Delta x_u + g_u^{Gs}\Delta\tau_u + d\tilde{t}_{u,G} + \mu_j \tilde{i}_u^{Gs} + \tilde{d}_{u,j,G};$$

correcting observed-minus-computed (O–C) terms for user end LEO carrier phase observations and user end LEO code observations according to the vector of estimated reformed LEO satellite clock errors $\hat{dt}^{Ls}$, the vector of estimated reformed LEO satellite phase biases $\hat{\tilde{\delta}}_j^{Ls}$, and the vector of estimated reformed LEO satellite code biases $\hat{\tilde{d}}_j^{Ls}$ in the situation of j>2, to obtain the corrected user end LEO UDUC observation equations expressed as follows:

$$E(\Delta\varphi_{u,j}^{Ls} + \hat{dt}^{Ls} + \hat{\tilde{\delta}}_j^{Ls}) = (G_u^{Ls})^T \Delta x_u + g_u^{Ls}\Delta\tau_u + d\tilde{t}_{u,L} - \mu_j \tilde{i}_u^{Ls} + \tilde{\delta}_{u,j,L} + \lambda_j \tilde{N}_{u,j}^{Ls};$$

$$E(\Delta p_{u,j}^{Ls} + \hat{dt}^{Ls} + \hat{\tilde{d}}_{j>2}^{Ls}) = (G_u^{Ls})^T \Delta x_u + g_u^{Ls}\Delta\tau_u + d\tilde{t}_{u,L} + \mu_j \tilde{i}_u^{Ls} + \tilde{d}_{u,j,L},$$

where a subscript u represents a user u, $\Delta x_u$ represents a user three-dimensional coordinate increment vector, $\Delta\tau_u$ represents a user zenith tropospheric wet delay, and $G_u^{Gs}$ and $G_u^{Ls}$ represent a matrix including directional vectors from all visible satellites of the GNSSs to a user receiver and a matrix including directional vectors from all visible satellites of the LEO satellite navigation system to the user receiver, respectively.

In an embodiment of the present disclosure, step 4 includes:
performing a least-squares adjustment on the corrected user end GNSS UDUC observation equations and the corrected user end LEO UDUC observation equations, to obtain the user end positioning vector in the ambiguity-float mode; and the user end float ambiguity vector and the variance-covariance matrix of the user end float ambiguity vector.

In an embodiment of the present disclosure, step 5 includes:
correcting the corrected user end GNSS UDUC observation equations and the corrected user end LEO UDUC observation equations with the fully or partially fixed user end ambiguity vector; and performing the least-squares adjustment on the user end GNSS UDUC observation equations in the PAR-enabled mode and the user end LEO UDUC observation equations to obtain a user end positioning vector in the PAR-enabled mode.

Compared with the related art, the beneficial effects of the present disclosure are as follows. For the LEO-augmentation-based convergence time shortening method of wide-area UDUC PPP-RTK positioning of the present disclosure, navigation signals of an LEO satellite navigation system are integrated into the process of calculating of network end parameters and user positioning based on UDUC observation equations during performing GNSS-based wide-area PPP-RTK positioning using, which significantly shortens the convergence time of user positioning based on wide-area UDUC PPP-RTK, and speeds up the IAR, and the convergence of the user positioning result based on wide-area UDUC PPP-RTK is no longer limited or sensitive to a strength of the original GNSS observation model, including the number of the GNSSs used, whether to solve the integer ambiguity or not, and the user positioning mode.

The above description merely outlines the technical solutions of the present disclosure. To better understand the technical means of the present disclosure and to make the above and other objectives, features, and advantages of the present disclosure more apparent and understandable, exemplary embodiments are provided below in conjunction with accompanying drawings, to provide a detailed explanation.

DETAILED DESCRIPTION OF EMBODIMENTS

To further explain the technical means and effects adopted by the present disclosure to achieve predetermined purposes of the present disclosure, the following detailed description is provided for an LEO-augmentation-based convergence time shortening method of wide-area UDUC PPP-RTK positioning in conjunction with the accompanying drawings and specific embodiments.

The foregoing and other technical contents, features, and effects of the present disclosure can be clearly presented in the following detailed description in conjunction with the accompanying drawings. Through the detailed description of the specific embodiments, the technical means and effects adopted by the present disclosure to achieve the predetermined purposes can be more deeply and specifically understood. However, the accompanying drawings are merely for reference and illustration purposes, and are not used to limit the technical solutions of the present disclosure.

Embodiment 1

Figure 1:
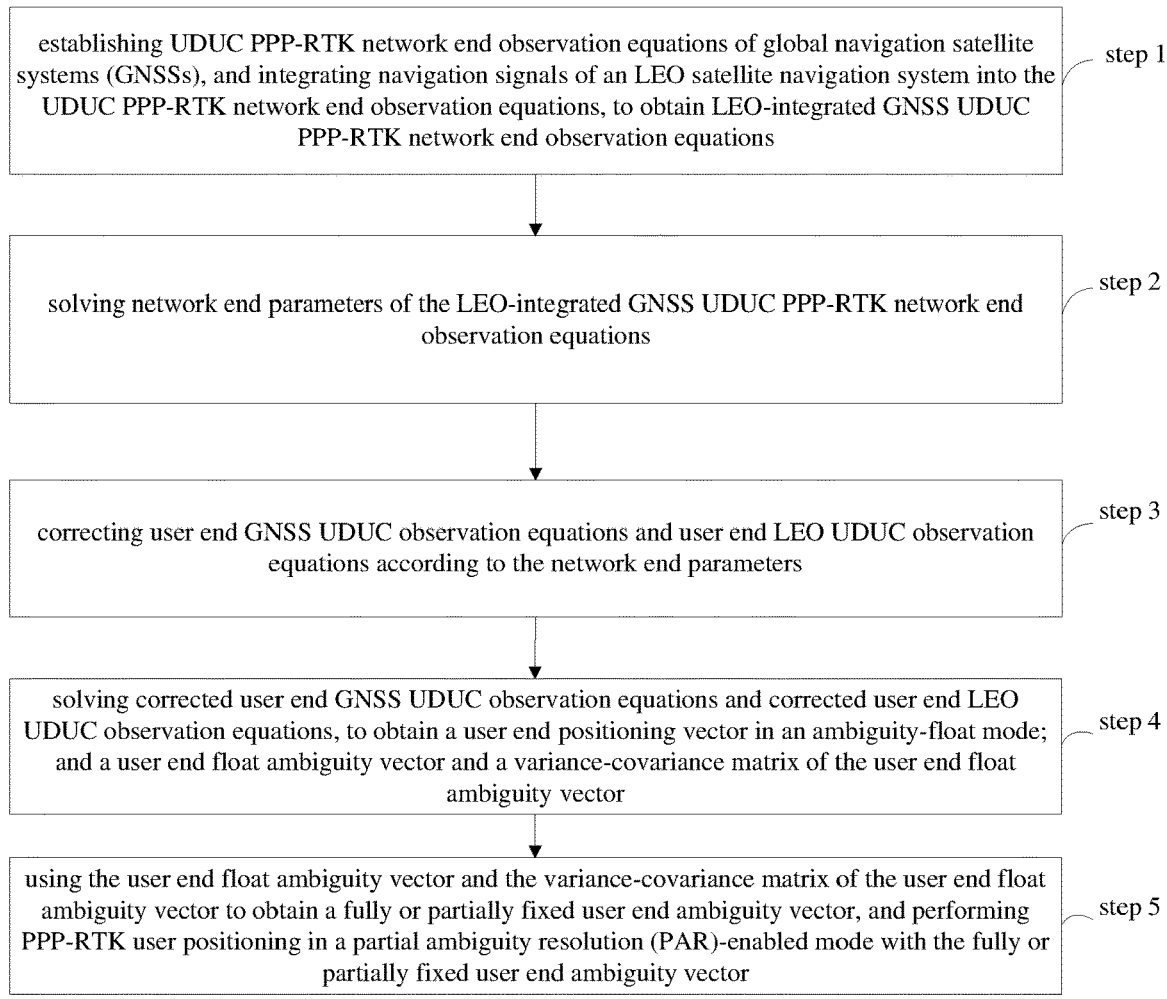
FIG. 1 illustrates a schematic view of an LEO-augmentation-based convergence time shortening method of wide-area UDUC PPP-RTK positioning according to an embodiment of the present disclosure.

Since an LEO satellite has a much lower altitude than that of a GNSS satellite in a medium to high Earth orbit, it moves faster, and provides a rapid geometric change for ground users. As such, it can significantly shorten the convergence time of the PPP. For a user of GNSS-based wide-area PPP-RTK who needs to fix an integer ambiguity vector but lacks high-precision ionospheric delay corrections, the convergence time of positioning still needs to be improved. The advantage of a rapid geometric change provided by an LEO satellite navigation system can provide a possibility for improving the convergence time. Based on this, this embodiment provides an LEO-augmentation-based convergence time shortening method of wide-area UDUC PPP-RTK positioning. Please refer to a schematic view shown in FIG. 1 for an LEO-augmentation-based convergence time shortening method of wide-area UDUC PPP-RTK positioning. As shown in the FIG. 1, the method of this embodiment includes:

step 1, establishing UDUC PPP-RTK network end observation equations of global navigation satellite systems (GNSSs), and integrating navigation signals of an LEO satellite navigation system into the UDUC PPP-RTK network end observation equations, to obtain LEO-integrated GNSS UDUC PPP-RTK network end observation equations.

Specifically, UDUC observation equations of GNSSs are obtained based on raw observation data of GNSSs. Original parameters in the UDUC observation equations are reformed based on the S-system theory to eliminate rank deficiencies. Observation equations based on reformed parameters, that is, the UDUC PPP-RTK network observation equations of GNSSs, are obtained.

The original parameters include: a zenith tropospheric wet delay $\Delta\tau_r$, a receiver clock error $dt_r$, a satellite clock error $dt^{Gs}$, an ionospheric delay $\iota_r^{Gs}$ the first frequency, a receiver code bias $d_{r,j,G}$, a receiver phase bias $\delta_{r,j,G}$, a satellite code bias $d_j^{Gs}$, a satellite phase bias $\delta_j^{Gs}$, and an integer ambiguity $N_{r,j}^{Gs}$. Among them, subscripts r, j, G represent receiver r, frequency j, and GNSS G, a superscript Gs represents satellite s in the GNSSs G, and reformed parameters are added with subscripts~ to distinguish them from the corresponding original parameters.

In this embodiment, the UDUC PPP-RTK network observation equations of the GNSSs, that is, observed-minus-computed (O–C) terms (i.e., O–C term) of a GNSS carrier phase observation and a GNSS pseudo-range (code) observation are expressed as the following equations (1) and (2):

$$E(\Delta\varphi_{r,j,G}^{Gs}) = g_r^{Gs}\Delta\tau_r + d\tilde{t}_{r,G} - d\tilde{t}^{Gs} - \mu_j\tilde{\iota}_r^{Gs} + \tilde{\delta}_{r,j,G} - \tilde{\delta}_j^{Gs} + \lambda_j\tilde{N}_{r,j}^{Gs} \quad (1);$$

$$E(\Delta p_{r,j,G}^{Gs}) = g_r^{Gs}\Delta\tau_r + d\tilde{t}_{r,G} - d\tilde{t}^{Gs} + \mu_j\tilde{\iota}_r^{Gs} + \tilde{d}_{r,j,G} - \tilde{d}_j^{Gs} \quad (2);$$

where $E(\cdot)$ represents an expectation operator, $\Delta\varphi_{r,j,G}^{Gs}$ and $\Delta p_{r,j,G}^{Gs}$ represent observed-minus-computed (O–C) terms for a carrier phase observation and a pseudo-range (code) observation, $g_r^{Gs}$ represents a mapping function for a zenith tropospheric wet delay in a signal direction, $\mu_j=f_1^2/f_j^2$, $f_j$ represents a j-th frequency used in the GNSS G, $\lambda_j$ represents a corresponding wavelength of the j-th frequency, $d\tilde{t}_{r,G}$ represents a reformed receiver clock error, $d\tilde{t}^{Gs}$ represents a reformed GNSS satellite clock error, $\tilde{\iota}_r^{Gs}$ represents a reformed ionospheric delay on the first frequency, $\tilde{\delta}_{r,j,G}$ represents a reformed receiver phase bias, $\tilde{\delta}_j^{Gs}$ represents a reformed GNSS satellite phase bias, $\tilde{N}_{r,j}^{Gs}$ represents a reformed integer ambiguity, $\tilde{d}_{r,j,G}$ represents a reformed receiver code bias, and $\tilde{d}_j^{Gs}$ represents a reformed GNSS satellite code bias.

It should be noted that the zenith tropospheric wet delay $\Delta\tau_r$ is not reformed, and since the reformed receiver clock error $d\tilde{t}_{r,G}$ includes hardware delays, it is indicated with the subscript G, to represent a separate solution for each system.

The specific forms of the reformed parameters are related to constraints applied to the parameters (such as whether to add time constraints to the hardware biases), which will not be described in detail herein. In the case that both the satellite and the receiver hardware biases are subject to the time constraint, to eliminate the rank deficiency, $dt_{1,G}(t_i)$, $d_{1,j,G}(t_1)$, $\delta_{1,j,G}(t_i)$, $N_{1,j}^{Gs}(t_i)$, $N_{r,j}^{G1}(t_i)$, $d_{r\neq1,j=1,2,G}(t_1)$, $d_{j=1,2}^{Gs}(t_1)$ are used as S-basis parameters and are not solved. Here, the subscript j=1, 2 refers to the first two frequency bands used in the system.

Further, by integrating multi-frequency LEO navigation signals into the above observation equations, the LEO-integrated GNSS UDUC PPP-RTK network end observation equations can be obtained. The O–C terms for a carrier phase and a pseudo-range measurement of the LEO satellite navigation system can be expressed as the following equations (3) and (4):

$$E(\Delta\varphi_{r,j,L}^{Ls}) = g_r^{Ls}\Delta\tau_r + d\tilde{t}_{r,L} - d\tilde{t}^{Ls} - \mu_j\tilde{\iota}_r^{Ls} + \tilde{\delta}_{r,j,L} - \tilde{\delta}_j^{Ls} + \lambda_j\tilde{N}_{r,j}^{Ls} \quad (3);$$

$$E(\Delta p_{r,j,L}^{Ls}) = g_r^{Ls}\Delta\tau_r + d\tilde{t}_{r,L} - d\tilde{t}^{Ls} + \mu_j\tilde{\iota}_r^{Ls} + \tilde{d}_{r,j,L} - \tilde{d}_j^{Ls} \quad (4);$$

where a subscript L represents the LEO satellite navigation system, and a superscript Ls represents satellite s in the LEO satellite navigation system L. It should be noted that the subscripts G and L are used to distinguish between the GNSSs and the LEO satellite navigation system.

In this embodiment, as seen from equations (1)-(4), after integrating the navigation signals (i.e., LEO observations) of the LEO satellite navigation system into the UDUC PPP-RTK network end observation equation, the zenith tropospheric wet delay $\Delta\tau_r$ is a common estimable parameter of the LEO satellite navigation system and the GNSSs, which establishes the correlation between other LEO-related parameters and GNSS-related parameters, thereby making PPP-RTK solution of the LEO-integrated GNSS network end different from separate solutions.

Step 2, solving network end parameters of the LEO-integrated GNSS UDUC PPP-RTK network end observation equations.

In this embodiment, the network end parameters include: a vector of estimated reformed GNSS satellite clock errors $d\hat{\tilde{t}}^{Gs}$, a vector of estimated reformed LEO satellite clock errors $d\hat{\tilde{t}}^{Ls}$, a vector of estimated reformed GNSS satellite phase biases $\hat{\tilde{\delta}}_j^{Gs}$, and a vector of estimated reformed LEO satellite phase biases $\hat{\tilde{\delta}}_j^{Ls}$. In a situation of j>2, the network end parameters further include a vector of estimated reformed GNSS satellite code bias $\hat{\tilde{d}}_j^{Gs}$, and a vector of estimated reformed LEO satellite code biases $\hat{\tilde{d}}_j^{Ls}$.

Specifically, the solution of the network end parameters is explained as follows.

Firstly, based on equations (1)-(4), considering the corresponding time constraints applied to the parameters (including zenith tropospheric wet delay, hardware biases of the satellite and the receiver, and an integer ambiguity vector), PPP-RTK network end parameters in an ambiguity-float mode are first solved using a least-squares adjustment. Based on the time constraints of the parameters, the estimated parameter vector $\Delta \hat{X}(t_{i-1})$ obtained at the preceding epoch is updated as $\Delta \hat{X}(t_{i|i-1})$ according to the sequential least-squares adjustment, which is expressed as follows:

$$\Delta \hat{X}(t_{i|i-1}) = \Delta \hat{X}(t_{i-1}) \quad (5);$$

$$Q_{\hat{X}}(t_{i|i-1}) = Q_{\hat{X}}(t_{i-1}) + S_X \quad (6),$$

where $Q_{\hat{X}}(t_{i-1})$ represents the variance-covariance matrix of $\Delta \hat{X}(t_{i-1})$, $Q_{\hat{X}}(t_{i|i-1})$ represents the variance-covariance matrix of $\Delta \hat{X}(t_{i|i-1})$, and $S_X$ represents a matrix of system noise between two epochs.

It should be noted that $\Delta \hat{X}$ includes not only the related parameters of the GNSSs, but also those of the LEO satellite navigation system.

Furthermore, based on equations (1)-(6), an elevation-dependent weighting function is used for the observation noise of the GNSSs and the LEO satellite navigation system, and the least-squares adjustment is used to solve the network end parameters in the ambiguity-float mode. Based on the estimated float ambiguity vector and its variance-covariance matrix of the GNSSs and the LEO satellite navigation system, the least square ambiguity decorrelation adjustment (LAMBDA) algorithm is used to decorrelate the float ambiguity vector through linear transformation, obtain integer ambiguity vector, and transform back to the forms of $\tilde{N}_{r,j}^{Gs}$ and $\tilde{N}_{r,j}^{Ls}$, that is, the fixed integer ambiguity vector of the GNSSs and the LEO satellite navigation system. In this embodiment, a partial ambiguity resolution (PAR) method is used to solve the integer ambiguity vector, which fixes a part of the ambiguity vector to integers when the system cannot completely resolve the integer ambiguity vector.

Furthermore, after the integer ambiguity vector are fixed, the network end parameters are provided by the network end to the user to realize the IAR and high-precision positioning of the user end.

Step 3, correcting user end GNSS UDUC observation equations and user end LEO UDUC observation equations according to the network end parameters.

Specifically, step 3 includes:
correcting observed-minus-computed (O-C) terms for user end GNSS carrier phase observations and user end GNSS code observations using the vector of estimated reformed GNSS satellite clock errors $\hat{dt}^{Gs}$, the vector of estimated reformed GNSS satellite phase biases $\hat{\tilde{\delta}}_j^{Gs}$, and the vector of estimated reformed GNSS satellite code biases $\hat{\tilde{d}}_j^{Gs}$ in the situation of j>2, to obtain the corrected user end GNSS UDUC observation equations expressed as follows:

$$E(\Delta \varphi_{u,j}^{Gs} + \hat{dt}^{Gs} + \hat{\tilde{\delta}}_j^{Gs}) = (G_u^{Gs})^T \Delta x_u + g_u^{Gs} \Delta \tau_u + \tilde{dt}_{u,G} - \mu_j \tilde{t}_u^{Gs} + \tilde{\delta}_{u,j,G} + \lambda_j \tilde{N}_{u,j}^{Gs} \quad (7);$$

$$E(\Delta p_{u,j}^{Gs} + \hat{dt}^{Gs} + \hat{\tilde{d}}_{j>2}^{Gs}) = (G_u^{Gs})^T \Delta x_u + g_u^{Gs} \Delta \tau_u + \tilde{dt}_{u,G} + \mu_j \tilde{t}_u^{Gs} + \tilde{d}_{u,j,G} \quad (8);$$

correcting observed-minus-computed (O-C) terms for user end LEO carrier phase observations and user end LEO code observations using the vector of estimated reformed LEO satellite clock errors $\hat{dt}^{Ls}$, the vector of estimated reformed LEO satellite phase biases $\hat{\tilde{\delta}}_j^{Ls}$, and the vector of estimated reformed LEO satellite code biases $\hat{\tilde{d}}_j^{Ls}$ in the situation of j>2, to obtain the corrected user end LEO UDUC observation equations expressed as follows:

$$E(\Delta \varphi_{u,j}^{Ls} + \hat{dt}^{Ls} + \hat{\tilde{\delta}}_j^{Ls}) = (G_u^{Ls})^T \Delta x_u + g_u^{Ls} \Delta \tau_u + \tilde{dt}_{u,L} - \mu_j \tilde{t}_u^{Ls} + \tilde{\delta}_{u,j,L} + \lambda_j \tilde{N}_{u,j}^{Ls} \quad (9);$$

$$E(\Delta p_{u,j}^{Ls} + \hat{dt}^{Ls} + \hat{\tilde{d}}_{j>2}^{Ls}) = (G_u^{Ls})^T \Delta x_u + g_u^{Ls} \Delta \tau_u + \tilde{dt}_{u,L} + \mu_j \tilde{t}_u^{Ls} + \tilde{d}_{u,j,L} \quad (10),$$

where a subscript u represents a user u, $\Delta x_u$ represents a user three-dimensional coordinate increment vector, $\Delta \tau_u$ represents a user zenith tropospheric wet delay, and $G_u^{Gs}$ and $G_u^{Ls}$ represent a matrix including directional vectors from all visible satellites of the GNSSs to a user receiver and a matrix including directional vectors from all visible satellites of the LEO satellite navigation system to the user receiver, respectively.

Step 4, solving the corrected user end GNSS UDUC observation equations and the corrected user end LEO UDUC observation equations, to obtain a user end positioning vector in an ambiguity-float mode; and a user end float ambiguity vector and a variance-covariance matrix of the user end float ambiguity vector.

In this embodiment, according to equations (7)-(10), a user solution in the ambiguity-float mode can be obtained by using the least-squares adjustment considering the time constraints on the receiver hardware biases, the integer ambiguity vector and other parameters (see the equations (5)-(6)). As can be seen from equations (7)-(10), the user coordinate increment $\Delta x_u$ and the user zenith tropospheric wet delay $\Delta \tau_u$ are parameters jointly involved in the processing of GNSS and LEO observations. Therefore, the advantage of fast satellite geometry change brought by the LEO satellites will be reflected in the positioning results.

Specifically, step 4 includes: performing the least-squares adjustment on the corrected user end GNSS UDUC observation equations and the corrected user end LEO UDUC observation equations, to obtain the user end positioning vector in the ambiguity-float mode; and the user end float ambiguity vector and the variance-covariance matrix of the user end float ambiguity vector.

In this embodiment, based on obtained float ambiguity vectors $\hat{\tilde{N}}_{u,j}^{Gs}$ and $\hat{\tilde{N}}_{u,j}^{Ls}$ for the GNSSs and the LEO satellite navigation system, and using the corresponding variance-covariance matrix of all the float ambiguity vector $Q_{\tilde{N}}$, the user end integer ambiguity vector are partially or partially fixed using the LAMBDA algorithm and the partial ambiguity resolution (PAR) method.

It should be noted that the variance-covariance matrix $Q_{\tilde{N}}$ herein no longer distinguishes between the GNSS and the LEO satellite navigation system, which considers the correlations between integer ambiguity vector of the GNSSs and the LEO satellite navigation system.

Step 5, using the user end float ambiguity vector and the variance-covariance matrix of the user end float ambiguity vector to obtain a fully or partially fixed user end ambiguity vector, and performing PPP-RTK user positioning in a partial ambiguity resolution (PAR)-enabled mode with the fully or partially fixed user end ambiguity vector.

Specifically, step 5 includes: correcting the corrected user end GNSS UDUC observation equations and the corrected user end LEO UDUC observation equations with the fully or partially fixed user end ambiguity vector; and performing the least-squares adjustment on the user end GNSS UDUC observation equations and the user end LEO UDUC observation equations to obtain a user end positioning vector in the PAR-enabled mode.

In this embodiment, all fixed integer ambiguity vectors of the GNSSs and the LEO satellite navigation system are corrected in the O–C terms of equations (7)-(10), taking into account the time constraints of the remaining parameters (see equations (5)-(6)). The user three-dimensional coordinate increment vector $\Delta x_u$ is obtained by using the least-squares adjustment to achieve user positioning.

In other embodiments, the user may also choose not to fix the integer ambiguity vector and solve the three-dimensional coordinates in the ambiguity-float mode, i.e., using the least-squares adjustment to process the user end GNSS UDUC observation equations and the user end LEO UDUC observation equations, and solving for the user three-dimensional coordinate increment in the ambiguity-float mode.

For the LEO-augmentation-based convergence time shortening method of wide-area UDUC PPP-RTK positioning of this embodiment, navigation signals of an LEO satellite navigation system are integrated into the process of calculating of network end parameters and user positioning based on UDUC observation equations during performing wide-area PPP-RTK positioning using GNSSs, which significantly shortens the convergence time of user positioning based on wide-area UDUC PPP-RTK, and speeds up the resolution of integer ambiguity vector, and the convergence of the user positioning based on wide-area UDUC PPP-RTK is no longer limited or sensitive to the strength of the original GNSS observation model, including the number of the GNSSs, whether to solve the integer ambiguity vector or not, and the user positioning mode.

Compared with the traditional wide-area UDUC PPP-RTK positioning, which only uses GNSS satellites with slowly changing satellite geometry and does not correct ionospheric delays on the network end, which leads to a long convergence time, the LEO-augmentation-based convergence time shortening method of wide-area UDUC PPP-RTK positioning in this embodiment can accelerate convergence and IAR after the navigation signals of the LEO satellite navigation system are integrated into the network end processing and the user end processing. This enables the wide-area PPP-RTK user to enhance the model strength, and greatly shorten the convergence time of the user positioning solution to high accuracy without using ionospheric delays provided by the network end, thus realizing fast and high-precision user positioning of wide-area PPP-RTK.

Embodiment 2

This embodiment illustrates the effect of the LEO-augmentation-based convergence time shortening method of wide-area UDUC PPP-RTK positioning presented in the embodiment 1.

The user end UDUC PPP-RTK positioning is performed with a sampling interval of 30 s after 3 hours of convergence of the network end processing. The example used satellite geometry of the GPS satellites and 150 simulated LEO satellites from a ground station network ranging to more than a thousand kilometers with more than 20 reference stations distributed in central and eastern parts of China. Real-time GPS orbital products provided by the National Centre for Space Studies (CNES) in France on Feb. 1, 2022, and simulated LEO satellite orbits considering sub-decimeter- to decimeter-level orbital errors were used in the processing.

Figure 2A:
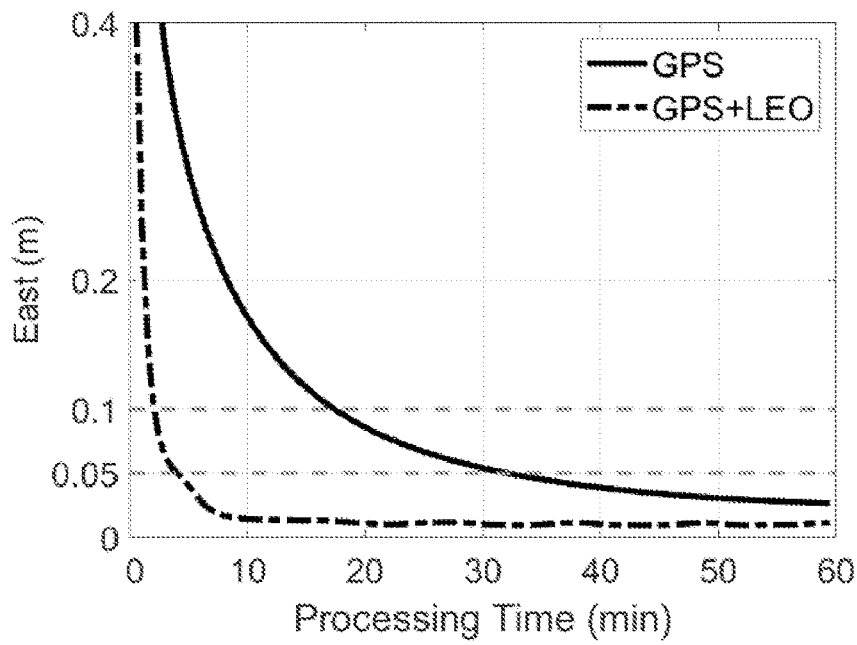
FIGS. 2(a)-2(c) illustrate formal precision of the ambiguity-float positioning solution of a user station in different directions for the GPS-only case and LEO-GPS-combined case according to an embodiment of the present disclosure.
Figure 2B:
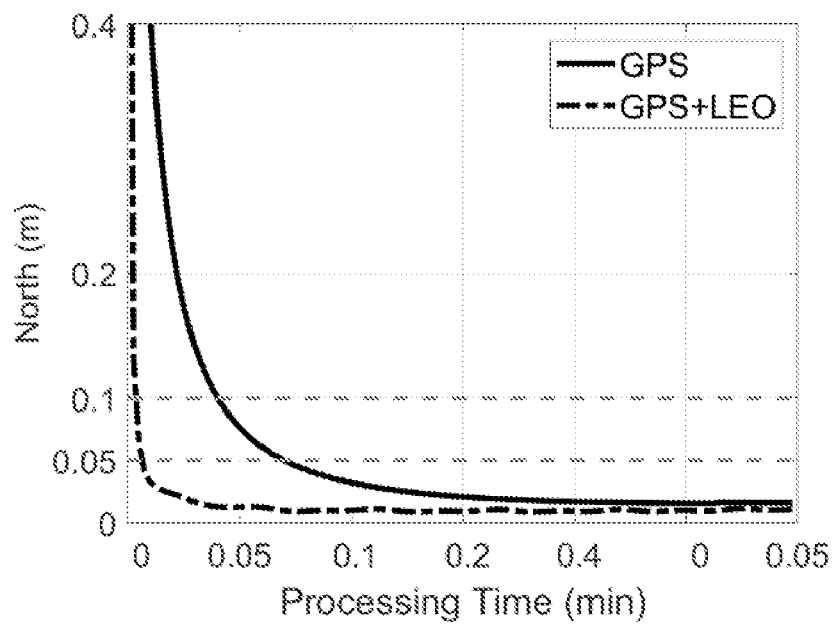
Figure 2C:
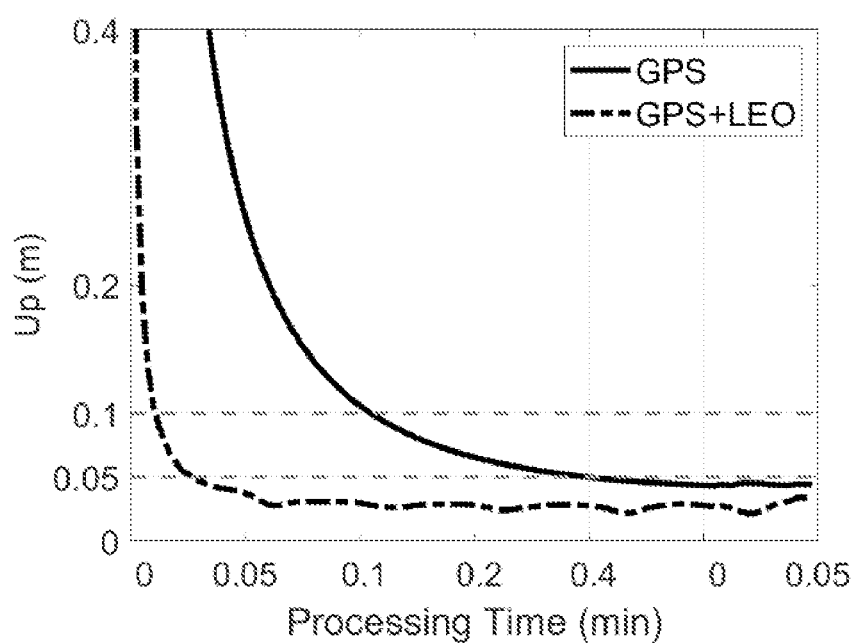

Please refer to FIGS. 2(a)-2(c), FIGS. 2(a)-2(c) illustrate formal precision of kinematic positioning solutions in the ambiguity-float mode when the user station only uses dual-frequency L1/L2 GPS signals and uses both the GPS signals and simulated dual-frequency L1/L5 LEO navigation signals, where FIG. 2(a) corresponds to the user coordinate format precision in the east direction, FIG. 2(b) corresponds to those in the north direction, and FIG. 2(c) corresponds to those in the up direction. As can be seen from the FIGS. 2(a)-2(c), the convergence time of the formal precision of GPS-only ambiguity-float positioning solution is greatly shortened with the help of the LEO augmentation, especially in the east and up directions where convergences are slow. In the case of LEO augmentation, the formal precision of the ambiguity-float solutions in all three directions converges to 5 centimeters (cm) in about 5 minutes. The accelerated convergence of the float solution will also help to solve the integer ambiguity vector quickly.

Figure 3A:
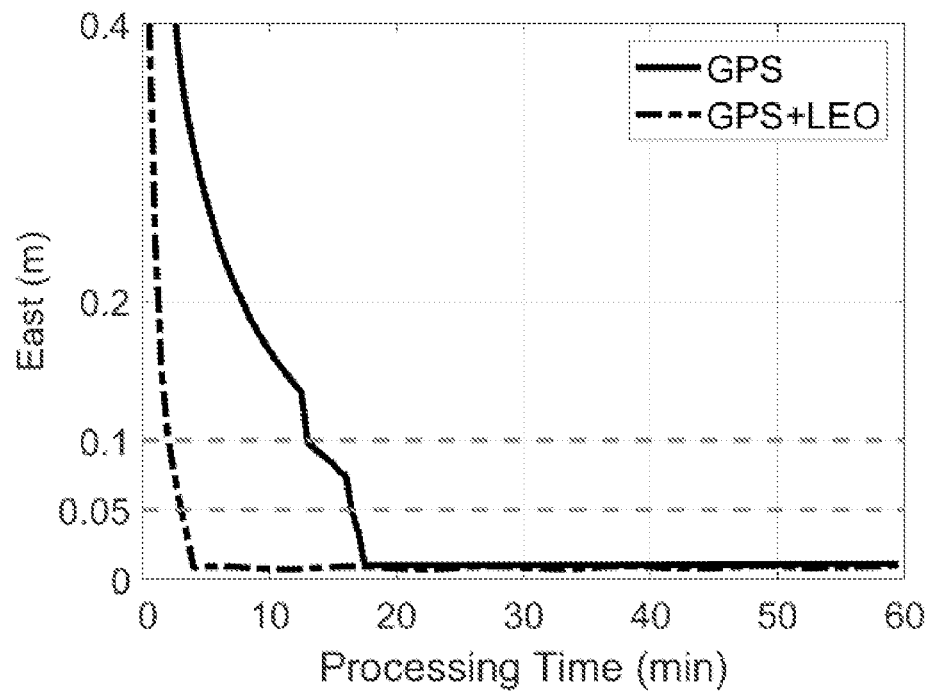
FIGS. 3(a)-3(c) illustrate formal precision of the PAR-enabled positioning solution of a user station in different directions for the GPS-only case and LEO-GPS-combined case according to an embodiment of the present disclosure.
Figure 3B:
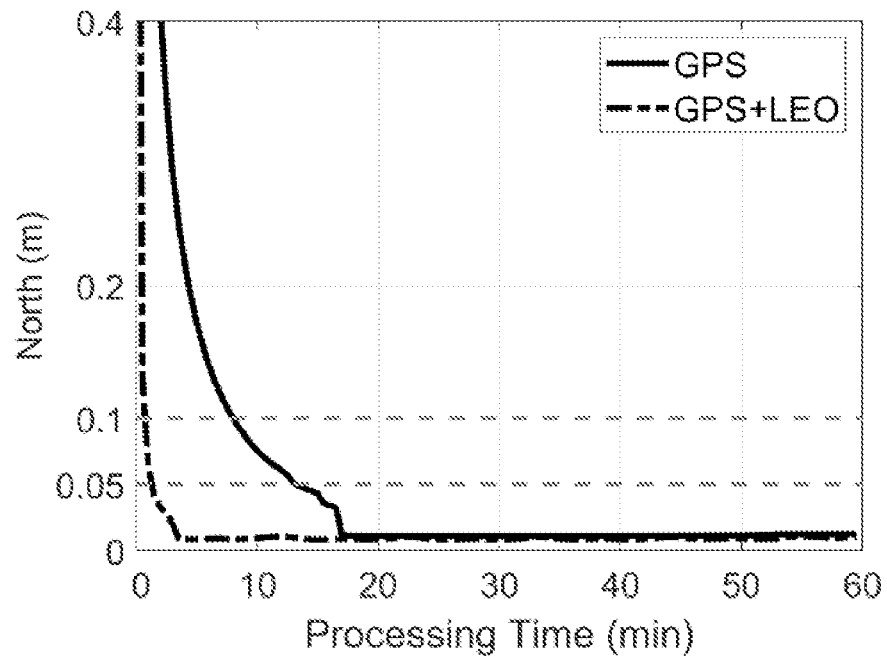
Figure 3C:
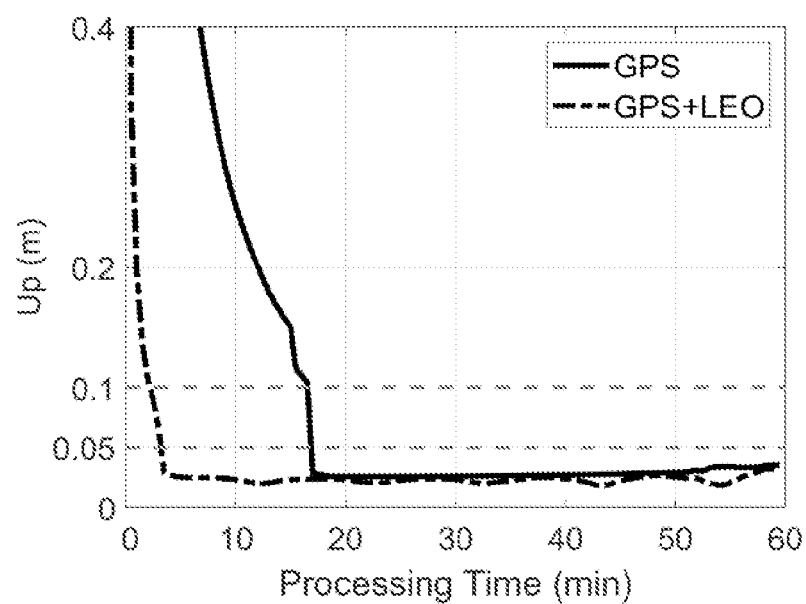

After the partial ambiguity resolution (PAR) strategy is enabled, the formal precision of the user end kinematic positioning is shown in FIGS. 3(a)-3(c), where FIG. 3(a) corresponds to the user end positioning precision in the east direction, FIG. 3(b) corresponds to that in the north direction, and FIG. 3(c) corresponds to that in the up direction. As mentioned above, the accelerated convergence of LEO-augmented GPS ambiguity-float solution is helpful to accelerate the IAR, so that the IAR-enabled positioning solution can converge to high accuracy in a faster time. In this embodiment, the positioning precision in the east direction, the north direction and the up direction, respectively, converges to 5 cm in 3 minutes, 1.5 minutes and 3.5 minutes when the PAR is enabled, which is significantly improved compared with the convergence speed of the positioning solutions in the GPS-only case. The addition of the LEO augmentation system enhances the observation model and shortens the convergence time, so that the convergence of user positioning accuracy is no longer limited by the number of the original GNSSs, the user positioning mode (kinematic/static), and whether the integer ambiguity vector are solved.

It should be noted that terms such as "first" and "second" are only used to distinguish one entity or operation from another, without necessarily implying any actual relationship or order between these entities or operations. Moreover, the terms "including", "containing", or any other variants are intended to encompass non-exclusive inclusion, so that items or devices that include a series of elements not only include those elements, but also include other elements that are not explicitly listed. Without further limitation, the element limited by the statement "including a . . . " does not exclude the presence of another identical element in the item or device that includes the element. Words such as "connected" or "connected" are not limited to physical or mechanical connections, but may include electrical connections, whether direct or indirect. The directional or positional relationship indicated by terms such as "up", "down", "left", and "right" is based on the orientation or positional relationship shown in the accompanying drawings, solely for the convenience of describing the present disclosure and simplifying the description, and does not indicate or imply that the device or element referred to must have a specific orientation, be constructed and operated in a specific orientation, and therefore cannot be construed as limiting the present disclosure.

The above content is a further detailed description of the present disclosure based on specific preferred embodiments, and cannot be construed as limiting the specific implementation of the present disclosure to these descriptions. For those skilled in the art to which the present disclosure belongs, various simple deductions or replacements can be made without departing from the conceptual framework of the present disclosure, and all of which should be considered as within the scope of protection of the present disclosure.

What is claimed is:

1. A low-Earth-orbit (LEO)-augmentation-based convergence time shortening method of wide-area undifferenced and uncombined (UDUC) precise point positioning-real-time kinematic (PPP-RTK) positioning, comprising:
   step 1, establishing UDUC PPP-RTK network end observation equations of global navigation satellite systems (GNSSs), and integrating navigation signals of an LEO satellite navigation system into the UDUC PPP-RTK network end observation equations, to obtain LEO-integrated GNSS UDUC PPP-RTK network end observation equations;
   step 2, solving network end parameters of the LEO-integrated GNSS UDUC PPP-RTK network end observation equations;
   step 3, correcting user end GNSS UDUC observation equations and user end LEO UDUC observation equations according to the network end parameters;
   step 4, solving corrected user end GNSS UDUC observation equations and corrected user end LEO UDUC observation equations, to obtain a user end positioning vector in an ambiguity-float mode; and a user end float ambiguity vector and a variance-covariance matrix of the user end float ambiguity vector; and
   step 5, using the user end float ambiguity vector and the variance-covariance matrix of the user end float ambiguity vector to obtain a fully or partially fixed user end ambiguity vector, and performing PPP-RTK user positioning in a partial ambiguity resolution (PAR)-enabled mode with the fully or partially fixed user end ambiguity vector.

2. The LEO-augmentation-based convergence time shortening method of wide-area UDUC PPP-RTK positioning according to claim 1, wherein the UDUC PPP-RTK network end observation equations of the GNSSs are expressed as follows:

$$E(\Delta\varphi_{r,j,G}^{Gs}) = g_r^{Gs}\Delta\tau_r + d\tilde{t}_{r,G} - d\tilde{t}^{Gs} - \mu_j \tilde{\iota}_r^{Gs} + \tilde{\delta}_{r,j,G} - \tilde{\delta}_j^{Gs} + \lambda_j \tilde{N}_{r,j}^{Gs};$$

$$E(\Delta p_{r,j,G}^{Gs}) = g_r^{Gs}\Delta\tau_r + d\tilde{t}_{r,G} - d\tilde{t}^{Gs} + \mu_j \tilde{\iota}_r^{Gs} + \tilde{d}_{r,j,G} - \tilde{d}_j^{Gs};$$

where subscripts r, j, G represent a receiver r, a frequency j, and the GNSS G, respectively, a superscript Gs represents a satellite s in the GNSS G, ~ represents reformed parameters from original parameters for eliminating rank deficiencies, E(•) represents an expectation operator, $\Delta\varphi_{r,j,G}^{Gs}$ and $\Delta p_{r,j,G}^{Gs}$ represent observed-minus-computed (O–C) terms for a carrier phase observation and a pseudo-range (code) observation, $g_r^{Gs}$ represents a mapping function for a zenith tropospheric wet delay in a signal direction, $\Delta\tau_r$ represents the zenith tropospheric wet delay, $d\tilde{t}_{r,G}$ represents a reformed receiver clock error, $d\tilde{t}^{Gs}$ represents a reformed GNSS satellite clock error, $\mu_j = f_1^2/f_j^2$, $f_j$ represents a j-th frequency used in the GNSS G, $\lambda_j$ represents a corresponding wavelength of the j-th frequency, $\tilde{\iota}_r^{Gs}$ represents a reformed ionospheric delay on the first frequency, $\tilde{\delta}_{r,j,G}$ represents a reformed receiver phase bias, $\tilde{\delta}_j^{Gs}$ represents a reformed GNSS satellite phase bias, $\tilde{N}_{r,j}^{Gs}$ represents a reformed integer ambiguity, $\tilde{d}_{r,j,G}$ represents a reformed receiver code bias, and $\tilde{d}_j^{Gs}$ represents a reformed GNSS satellite code bias;

wherein the LEO-integrated UDUC PPP-RTK network end observation equations are expressed as follows:

$$E(\Delta\varphi_{r,j,L}^{Ls}) = g_r^{Ls}\Delta\tau_r + d\tilde{t}_{r,L} - d\tilde{t}^{Ls} - \mu_j \tilde{\iota}_r^{Ls} + \tilde{\delta}_{r,j,G} - \tilde{\delta}_j^{Ls} + \lambda_j \tilde{N}_{r,j}^{Ls};$$

$$E(\Delta p_{r,j,L}^{Ls}) = g_r^{Ls}\Delta\tau_r + d\tilde{t}_{r,L} - d\tilde{t}^{Ls} + \mu_j \tilde{\iota}_r^{Ls} + \tilde{d}_{r,j,L} - \tilde{d}_j^{Ls};$$

where a subscript L represents an LEO satellite navigation system, and a superscript Ls represents a satellites in the LEO satellite navigation system L.

3. The LEO-augmentation-based convergence time shortening method of wide-area UDUC PPP-RTK positioning according to claim 2, wherein the network end parameters comprises: a vector of estimated reformed GNSS satellite clock errors $\hat{d\tilde{t}}^{Gs}$, a vector of estimated reformed LEO satellite clock errors $\hat{d\tilde{t}}^{Ls}$, a vector of estimated reformed GNSS satellite phase biases $\hat{\tilde{\delta}}_j^{Gs}$, and a vector of estimated reformed LEO satellite phase biases $\hat{\tilde{\delta}}_j^{Ls}$; and in a situation of j>2, the network end parameters further comprises a vector of estimated reformed GNSS satellite code biases $\hat{\tilde{d}}G_j^{Gs}$, and a vector of estimated reformed LEO satellite code biases $\hat{\tilde{d}}_j^{Ls}$.

4. The LEO-augmentation-based convergence time shortening method of wide-area UDUC PPP-RTK positioning according to claim 3, wherein the step 3 comprises:
   correcting observed-minus-computed (O–C) terms for a user end GNSS carrier phase observation and a user end GNSS code observation according to the vector of estimated reformed GNSS satellite clock errors $\hat{d\tilde{t}}^{Gs}$, the vector of the estimated reformed GNSS satellite phase biases $\hat{\tilde{\delta}}_j^{Gs}$, and the vector of the estimated reformed GNSS satellite code biases $\hat{\tilde{d}}_j^{Gs}$ in the situation of j>2, to obtain the corrected user end GNSS UDUC observation equations expressed as follows:

$$E(\Delta\varphi_{u,j}^{Gs} + \hat{d\tilde{t}}^{Gs} + \hat{\tilde{\delta}}_j^{Gs}) = (G_u^{Gs})^T \Delta x_u + g_u^{Gs}\Delta\tau_u + d\tilde{t}_{u,G} - \mu_j \tilde{\iota}_u^{Gs} + \tilde{\delta}_{u,j,G} + \lambda_j \tilde{N}_{u,j}^{Gs};$$

$$E(\Delta p_{u,j}^{Gs} + \hat{d\tilde{t}}^{Gs} + \hat{\tilde{d}}_{j>2}^{Gs}) = (G_u^{Gs})^T \Delta x_u + g_u^{Gs}\Delta\tau_u + d\tilde{t}_{u,G} + \mu_j \tilde{\iota}_u^{Gs} + \tilde{d}_{u,j,G},$$

correcting observed-minus-computed (O–C) terms of a user end LEO carrier phase observation and a user end LEO code observation according to the vector of estimated reformed LEO satellite clock errors $\hat{d\tilde{t}}^{Ls}$, the vector of estimated reformed LEO satellite phase biases $\hat{\tilde{\delta}}_j^{Ls}$, and the vector of estimated reformed LEO satellite code biases $\hat{\tilde{d}}_j^{Ls}$ in the situation of j>2, to obtain the corrected user end LEO UDUC observation equations expressed as follows:

$$E(\Delta\varphi_{u,j}^{Ls} + \hat{d\tilde{t}}^{Ls} + \hat{\tilde{\delta}}_j^{Ls}) = (G_u^{Ls})^T \Delta x_u + g_u^{Ls}\Delta\tau_u + d\tilde{t}_{u,L} - \mu_j \tilde{\iota}_u^{Ls} + \tilde{\delta}_{u,j,L} + \lambda_j \tilde{N}_{u,j}^{Ls};$$

$$E(\Delta p_{u,j}^{Ls} + \hat{d\tilde{t}}^{Ls} + \hat{\tilde{d}}_{j>2}^{Ls}) = (G_u^{Ls})^T \Delta x_u + g_u^{Ls}\Delta\tau_u + d\tilde{t}_{u,L} + \mu_j \tilde{\iota}_u^{Ls} + \tilde{d}_{u,j,L},$$

where a subscript u represents a user u, $\Delta x_u$ represents a user three-dimensional coordinate increment vector, $\Delta \tau_u$ represents a user zenith tropospheric wet delay, and $G_u^{Gs}$ and $G_u^{Ls}$ represent a matrix comprising directional vectors from all visible satellites of the GNSSs to a user receiver and a matrix comprising directional vectors from all visible satellites of the LEO satellite navigation system to the user receiver, respectively.

5. The LEO-augmentation-based convergence time shortening method of wide-area UDUC PPP-RTK positioning according to claim 4, wherein the step 4 comprises:
performing a least-squares adjustment on the corrected user end GNSS UDUC observation equations and the corrected user end LEO UDUC observation equations, to obtain the user end positioning vector in the ambiguity-float mode; and the user end float ambiguity vector and the variance-covariance matrix of the user end float ambiguity vector.

6. The LEO-augmentation-based convergence time shortening method of wide-area UDUC PPP-RTK positioning according to claim 5, wherein the step 5 comprises:
correcting the corrected user end GNSS UDUC observation equations and the corrected user end LEO UDUC observation equations with the fully or partially fixed user end ambiguity vector; and performing the least-squares adjustment on the user end GNSS UDUC observation equations and the user end LEO UDUC observation equations to obtain a user end positioning vector in the PAR-enabled mode.

* * * * *